United States Patent Office 3,312,717
Patented Apr. 4, 1967

3,312,717
3 - OXYGENATED - 13β - ALKYL - 16 - OXAGONA-1,3,5(10) - TRIEN - 17 - ONES, D - HOMO COMPOUNDS CORRESPONDING, DERIVATIVES THEREOF, AND INTERMEDIATES THERETO
John S. Baran, Morton Grove, Ill., assignor to G. D. Searle & Co., Chicago, Ill., a corporation of Delaware
No Drawing. Filed Dec. 10, 1964, Ser. No. 417,509
21 Claims. (Cl. 260—343.2)

This application is a continuation-in-part of my copending application Ser. No. 302,011, filed Aug. 14, 1963, now abandoned.

The present invention is concerned with novel steroidal derivatives characterized by a heterocyclic D-ring, with the tricyclic hydroxy acids corresponding and with intermediates thereto. These D-ring heterocyclic compounds and the corresponding hydroxy acids are represented by the structural formulas

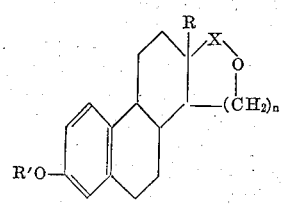

and

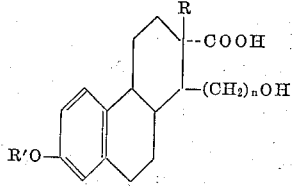

wherein R is a lower alkyl radical, n is a positive integer less than 3, R′ can be hydrogen or a lower alkyl or lower alkanoyl radical, and X can be a carbonyl radical or a radical of the formula

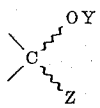

In the latter partial structural formula, Y represents hydrogen or a lower alkyl or lower alkanoyl radical, and Z is either hydrogen or a lower aliphatic hydrocarbon radical. The wavy lines indicate, in each instance, that the stereochemical configurations can be either "α" or "β."

Illustrative of the lower alkyl radicals symbolized in the foregoing structural representation are methyl, ethyl, propyl, butyl, pentyl, hexyl, and the branched-chain groups isomeric therewith. The lower alkanoyl radicals therein depicted are typified by acetyl, propionyl, butyryl, valeryl, caproyl, and the corresponding branched-chain isomers. The term lower aliphatic hydrocarbon radical encompasses lower alkyl radicals as hereinbefore exemplified, lower alkenyl radicals such as vinyl, propenyl, allyl, butenyl, crotyl, pentenyl, and hexenyl, and lower alkynyl radicals such as ethynyl, propargyl, propynyl, butynyl, pentynyl, and hexynyl.

The instant compounds illustrated in the foregoing structural representations can be manufactured from novel intermediates represented by the following structural formula

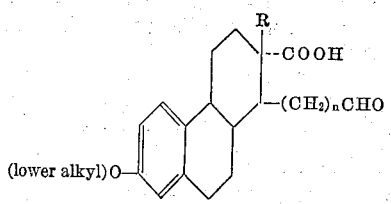

wherein n can be 0 or 1, and R is a lower alkyl radical. The intermediates in which n is 1 are obtained by cleavage of 3-(lower alkoxy)-13β-alkylgona-1,3,5(10)-trien-17-one 17-enol esters. As a specific example, 17-acetoxyestra-1,3,5(10),16-teteraen-3-ol 3-methyl ether in methylene chloride is contacted with a stream of oxygen containing ozone to yield trans-2-carboxy-1-formylmethyl-2-methyl-1,2,3,4,4a,9,10,10a - octahydrophenanthren-7-ol 7-methyl ether. Dehydration of that aldehydo-acid, typically with p-toluenesulfonic acid in benzene, results in 3-methoxy-17-oxa-D-homo-estra-1,3,5(10),15-tetraen-17a-one, which is submitted to an ozonolysis process analogous to that described above to produce trans-2-carboxy-1-formyl-2-methyl - 1,2,3,4,4a,9,10,10a-octahydrophenanthren-7-ol 7-methyl ether. Reduction of these aldehydo-acid intermediates affords the corresponding hydroxy acids, which are converted to the corresponding D-ring lactones. In the case of the D-homo lactones, lactonization occurs spontaneously during the reduction process. Thus, the aforementioned trans - 2 - carboxy - 1 - formylmethyl-2-methyl - 1,2,3,4,4a,9,10,10a-octahydrophenanthren-7-ol 7-methyl ether is allowed to react with sodium borohydride in aqueous ethanol to afford trans-2-carboxy-1-(2-hydroxyethyl)-2-methyl - 1,2,3,4,4a,9,10,10a-octahydrophenanthren-7-ol 7-methyl ether, which spontaneously cyclizes to afford 3-methoxy-17-oxa-D-homoestra-1,3,5(10)-trien-17a-one. When that reduction process is applied to trans - 2 - carboxy-1-formyl-2-methyl-1,2,3,4,4a,9,10,10a-octahydrophenanthren-7-ol 7-methyl ether, 2-carboxy-1-hydroxymethyl - 2-methyl-1,2,3,4,4a,9,10,10a-octahydrophenanthren-7-ol 7-methyl ether is obtained. Cyclization of the latter hydroxy-acid can be accomplished by heating with an acidic reagent in an inert organic solvent medium. When that reaction is conducted with p-toluenesulfonic acid in benzene, 3-methoxy-16-oxaestra-1,3,5(10)-trien-17-one is obtained.

The instant starting materials wherein the 13β-alkyl group contains more than one carbon atom are available as dl mixtures. The dl-hydroxy-acids produced therefrom can be resolved into the respective d and l forms; however, by salt formation with an optically active amine such as brucine, cinchonine, menthylamine, morphine, quinidine, quinine, or strychnine. Thus, dl-17-acetoxy-13β-ethylgona-1,3,5(10),16-tetraen-3-ol 3-methyl ether is ozonolyzed to afford dl-trans-2-carboxy-1-formylmethyl-2 - ethyl - 1,2,3,4,4a,9,10,10a - octahydrophenanthren-7-ol 7-methyl ether, which is cyclized to yield dl-13β-ethyl-3-methoxy - 17 - oxa - D - homogona - 1,3,5(10),15 - tetraen-17a-one, and the latter substance is ozonolyzed to produce dl - trans - 2 - carboxy - 1 - formyl - 2 - ethyl - 1,2,3,4,4a,9,10,10a - octahydrophenanthren - 7 - ol 7 - methyl ether, which is reduced to afford dl-trans-2-carboxy-1-hydroxymethyl - 2 - ethyl - 1,2,3,4,4a,9,10,10a - octahydrophenanthren-7-ol 7-methyl ether. Resolution of the latter substance into its *d* and *l* enantiomorphs is effected by salt formation with one of the aforementioned optically active amines.

The 3-hydroxy compounds of the present invention are conveniently produced by cleavage of the corresponding 3-(lower alkoxy) substances. As a specific illustration, 3-methoxy - 16 - oxaestra - 1,3,5(10) - trien - 17 - one is heated at elevated temperature with potassium hydroxide in aqueous ethanol to afford 3-hydroxy-16-oxaestra-1,3,5(10)-trien-17-one. Acylation of those 3-hydroxy derivatives affords the instant 3-(lower alkanoyl)oxy compounds. Thus, reaction of the aforementioned 3-hydroxy - 16 - oxaestra - 1,3,5(10) - trien - 17 - one with acetic anhydride and pyridine results in 3-acetoxy-16-oxaestra-1,3,5(10)-trien-17-one.

Cleavage of the instant lactones by treatment with alkali, followed by careful acidification results in the corresponding hydroxy acids. 3-hydroxy-16-oxaestra-1,3,5(10)-trien-17-one, for example, is dissolved in aqueous sodium hydroxide containing pyridine, and that solution is carefully acidified with dilute hydrochloric acid to yield trans - 2 - carboxy - 1 - hydroxymethyl - 2 - methyl - 1,2,3,4,4a,9,10,10a-octahydrophenanthren-7-ol.

Reduction of the instant lactones with a suitable reagent results in the corresponding lactols. These lactols exist as equilibrium mixtures of the tautomeric cyclic and open-chain forms, as is shown below:

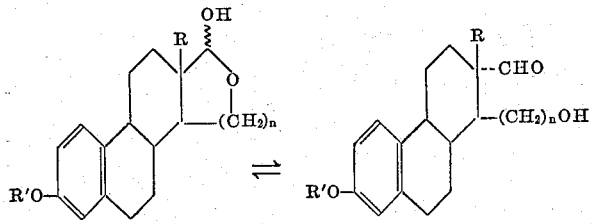

In that representation, R, R', and *n* have the identical meanings indicated hereinbefore. Illustrative of that reduction procedure is the reaction of 3-methoxy-16-oxaestra-1,3,5(10)-trien-17-one with diisobutyl aluminum hydride in toluene to afford 3-methoxy-16-oxaestra-1,3,5(10)-trien-17-ol, which is purified by chromatography to afford the pure 17α-epimer.

The instant compounds of the following structural formula

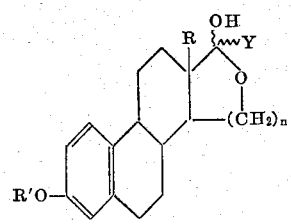

wherein Y is a lower aliphatic hydrocarbon radical, are conveniently obtained by reaction of the corresponding instant lactones with the appropriate organometallic reagent. These derivatives likewise exist as an equilibrium mixture of the tautomeric cyclic and open-chain forms as is shown below:

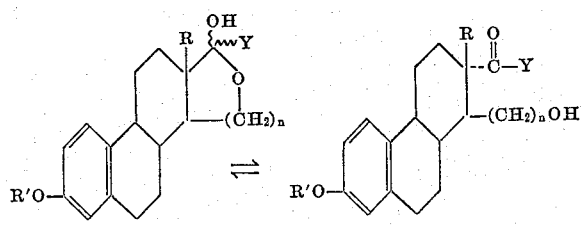

The preparation of a 17-alkyl substituted derivative is exemplified by the reaction of 3-methoxy-16-oxaestra-1,3,5(10)-trien-17-one with methyl magnesium bromide in dibutyl ether to afford trans-1-hydroxymethyl-2-(1-hydroxy - 1 - methyl)ethyl - 2 - methyl - 1,2,3,4,4a,9,10,10a-octahydrophenanthren-7-ol 7-methyl ether. Acetylation of that intermediate followed by dehydration, ozonolysis of the resulting olefin, and hydrolysis produces 17β-methyl - 16 - oxaestra - 1,3,5(10) - triene - 3,17α - diol 3 - methyl ether, which is in equilibrium with the open-chain tautomer, trans-1-hydroxymethyl-2-methyl-2-methylcarbonyl - 1,2,3,4,4a,9,10,10a - octahydrophenanthren-7-ol 7-methyl ether. When an alkenyl Grignard reagent is allowed to react with the instant lactones, the corresponding 17-(lower alkenyl)-17-ols are produced, while use of an alkynyl organometallic reagent results in the 17-(lower alkynyl)-17-ols encompassed in the foregoing representation. Thus, the aforementioned 3-methoxy-16-oxaestra - 1,3,5(10) - trien - 17 - one, when contacted with vinyl magnesium chloride in tetrahydrofuran affords trans - 1 - hydroxymethyl - 2 - methyl - 2 - vinylcarbonyl-1,2,3,4,4a,9,10,10a - octahydrophenanthren - 7 - ol 7-methyl ether, while reaction of that lactone with lithium acetylide in tetrahydrofuran results in 2-ethynylcarbonyl-1 - hydroxymethyl - 2 - methyl - 1,2,3,4,4a,9,10,10a - octahydrophenanthren-7-ol 7-methyl ether.

The 17-(lower alkyl)-17-ols, wherein the lower alkyl radical contains more than one carbon atom, can be produced alternatively by catalytic reduction of the corresponding 17-(lower alkynyl) or 17-(lower alkenyl) compounds. As a specific example, 3-methoxy-16-oxa-17β-(3 - n - butenyl) - estra - 1,3,5(10) - trien - 17a - ol is hydrogenated in the presence of a 5% palladium-on-carbon catalyst to afford 3-methoxy-16-oxa-17β-n-butyl-estra-1,3,5(10)-trien-17α-ol.

Reaction of the instant lactols with an alkylating or with an acylating medium affords the corresponding ethers and esters. 3-methoxy-17β-methyl-16-oxaestra-1,3,5(10)-trien-17α-ol, for example, is contacted with methanol in the presence of p-toluenesulfonic acid to afford 17β-methyl-16-oxaestra-1,3,5(10)-triene-3,17α - diol 3,17-dimethyl ether. Acylation of 3-methoxy-17-oxa-D-homoestra-1,3,5(10)-trien-17-ol with acetic anhydride and pyridine results in the corresponding 17-acetate.

In the case of the instant 5-membered ring lactols and the corresponding ethers and esters, the 17α-oxygenated epimer predominates. The 6-membered ring lactols and corresponding ethers and esters, on the other hand, are comprised of mixtures of the 17α- and 17β-epimers.

The lactones, lactols, and corresponding ethers and esters of the present invention are useful as a result of their valuable pharmacological properties. They are hypocholesterolemic agents, for example, in view of their ability to reduce blood plasma cholesterol levels while at the same time lacking significant estrogenic side-effects. In addition, they display anti-fertility properties.

The following examples illustrate in further detail some of the compounds which constitute this invention together with methods for their preparation. The invention, however, is not to be construed as limited thereby either in spirit or in scope as many modifications both in materials and methods can be adapted without departing from the invention herein described. In these examples, temperatures are indicated in degree centigrade (° C.) and quantities of materials in parts by weight unless otherwise noted.

*Example 1*

Into a solution of 9.3 parts of 17-acetoxyestra-1,3,5(10),16-tetraen-3-ol 3-methyl ether in 147 parts of methylene chloride, at about −70°, is passed a stream of oxygen containing 6% of ozone until one molecular equivalent of ozone is absorbed. To that reaction mixture is then added successively 2 parts of zinc and 42 parts of acetic acid, and the resulting mixture is stirred after the cooling bath is removed. An exothermic reaction ensues causing the temperature to rise to the reflux point, at which time heating is continued on the steam bath for about 15 minutes while the methylene chloride is removed by distillation. The residual mixture is diluted with about 300 parts of chloroform, then is filtered, and the filtrate is washed successively with water, dilute hydrochloric acid, and water. Distillation of the solvent at reduced pressure affords a residue which is dissolved in 30 parts of pyridine. To that pyridine solution is added a solution of 4 parts of potassium carbonate in 50 parts of water, and the resulting mixture is heated at about 90° for about 45 minutes, then is cooled to room temperature and poured carefully into a mixture of ice and excess dilute hydrochloric acid. The precipitate which forms is collected by filtration, washed on the filter with water, and dried in vacuo to afford trans-2-carboxy-1-formylmethyl-2-methyl - 1,2,3,4,4a,9,10,10a - octahydrophenanthren-7-ol 7-methyl ether, melting at about 146–150°. Recrystallization of this crude product from a mixture of ether and hexane affords the pure material, characterized by a melting point of 160–161° and an optical rotation of +79° in chloroform. Infrared absorption maxima are observed at about 3.41, 3.67, 5.79, 5.88, 6.21, 7.79, and 9.62 microns. This compound is characterized also by the structural formula

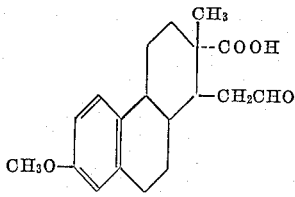

By substituting an equivalent quantity of 17-acetoxy-estra-1,3,5(10),16-tetraen-3-ol 3-ethyl ether in the procedure of this example, trans-2-carboxy-1-formylmethyl-2-methyl-1,2,3,4,4a,9,10,10a-octahydrophenanthren - 7-ol 7-ethyl ether is obtained.

Example 2

A mixture of 1.2 parts of trans-2-carboxy-1-formylmethyl-2-methyl - 1,2,3,4,4a,9,10,10a - octahydrophenanthren-7-ol 7-methyl ether and 1.2 parts of p-toluenesulfonic acid monohydrate in 440 parts of benzene is distilled over a period of about 2 hours, during which time approximately 220 parts of benzene is collected. The reaction mixture is cooled to room temperature, then is washed with saturated aqueous sodium bicarbonate, dried over anhydrous magnesium sulfate, and concentrated to dryness at reduced pressure. The residue which remains is triturated with ether to afford 3-methoxy-17-oxa-D-homoestra-1,3,5(10),15-tetraen-17a-one, which melts at about 139–154°. Decolorization by means of activated carbon and recrystallization from acetone result in the pure material, characterized by a melting point of about 160–163° and an optical rotation of −109° in chloroform. This compound displays infrared absorption peaks at about 3.38, 5.63, 6.02, 6.18, 8.58, 9.20, and 9.76 microns and is represented by the structural formula

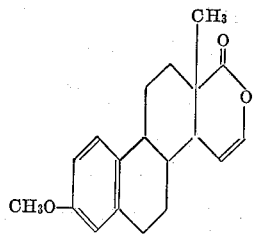

The substitution of an equivalent quantity of trans-2-carboxy-1-formylmethyl - 2-methyl-1,2,3,4,4a,9,10,10a-octahydrophenanthren-7-ol 7-ethyl ether in the process of this example results in 3-ethoxy-17-oxa-D-homoestra-1,2,5(10), 15-tetraen-17a-one.

Example 3

To a solution of one part of sodium borohydride in 50 parts of ethanol is added portionwise, with stirring, 1.1 parts of trans - 2 - carboxy - 1 - formylmethyl - 2 - methyl- 1,2,3,4,4a,9,10,10a - octahydrophenanthren-7-ol 7-methyl ether, and this reaction mixture is diluted with water after the initial reaction has subsided. Stirring of this mixture at room temperature is continued for about one hour, after which time it is acidified by means of dilute hydrochloric acid. The acidic mixture is diluted further with water, resulting in precipitation of the crude product. This solid material is collected by filtration and dried to afford 3 - methoxy-17-oxa-D-homoestra - 1,3,5(10)-trien-17a-one, melting at about 168–169° and characterized also by an optical rotation of +86.5° in chloroform. This substance displays infrared absorption maxima at about 3.39, 5.80, 6.22, 7.80, 8.65, 8.89, 9.03, 9.38, and 9.57 microns and is characterized also by the structural formula

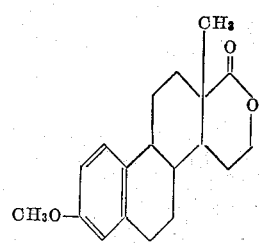

The substitution of an equivalent quantity of trans-2-carboxyl - 1 - formylmethyl - 2 - methyl - 1,2,3,4,4a,9,10,-10a-octahydrophenanthren-7-ol 7-ethyl ether in the procedure of this example results in 3-ethoxy-17-oxa-D-homoestra-1,3,5(10)-trien-17a-one.

Example 4

Into a solution of 6 parts of 3-methoxy-17-oxa-D-homoestra-1,3,5(10),15-tetraen-17a-one in 94 parts of methylene chloride, at −70°, is passed a stream of oxygen containing 6% of ozone. After approximately one molecular equivalent of ozone has been absorbed, the solution is flushed by means of a stream of nitrogen in order to remove excess oxidant, and 6 parts of zinc followed by 21 parts of acetic acid is added. This mixture is stirred at room temperature for about 45 minutes, then is concentrated to a small volume by distillation, and is diluted with about 600 parts of chloroform. The resulting mixture is filtered, and the filtrate is washed successively with water, dilute hydrochloric acid, and water. Distillation of this organic solution to dryness under reduced pressure affords a residue which is dissolved in 25 parts of pyridine. To that pyridine solution is added a solution of 6 parts of potassium carbonate in 100 parts of water, and that mixture is heated at about 90° for about 45 minutes, then is cooled to room temperature and is poured gradually with stirring into a mixture of ice and excess dilute hydrochloric acid. The resulting precipitated solid is collected by filtration, washed with water on the filter and dried, resulting in trans-2-carboxy-1 - formyl - 2 - methyl - 1,2,3,4,4a,9,10a - octahydrophenanthren-7-ol 7-methyl ether, melting at about 174–176°. Two successive recrystallizations from ether-acetone produce a sample of the pure material, melting at about 195–197° and characterized further by infrared absorption peaks at about 3.39, 3.63, 5.79, 5.84, 6.21, 7.75, 8.89, and 9.62 microns. It can be represented by the structural formula

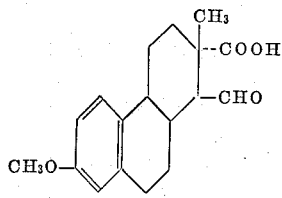

By substituting an equivalent quantity of 3-ethoxy-17-oxa-D-homoestra-1,3,5(10)-trien-17a-one and otherwise proceeding according to the process of this example, trans-2-carboxy-1-formyl-2-methyl-1,2,3,4,-4a,9,10,10a-octahydrophenanthren-7-ol 7-ethyl ether is obtained.

Example 5

To a solution of one part of sodium borohydride in 50 parts of ethanol is added slowly, with stirring, 1.05 parts of trans-2-carboxy-1-formyl-2-methyl-1,2,3,4,4a,9,-10,10a-octahydrophenanthren-7-ol 7 methyl ether, and the reaction mixture is diluted with water after the initial reaction subsides. The resulting solution is stirred at room temperature for about 45 minutes, then is made acidic by the addition of dilute hydrochloric acid, and is finally diluted with water to effect crystallization of the product. These crystals are collected by filtration, then washed on the filter with water and dried to produce trans-2-carboxy-1-hydroxymethyl-2-methyl-1,2,-3,4,4a,9,10,10a-octahydrophenanthren-7-ol 7-methyl ether, which melts at about 154–159° with evolution of a gas. Further purification is effected by recrystallization from acetone-hexane resulting in the pure material, melting at about 168–170° accompanied by evolution of a gas. This substance is further characterized by an optical rotation of +63.5° in chloroform and also by infrared absorption maxima at about 3.0–4.0, 3.4, 5.96, 6.2, 8.59, and 9.3 microns. It is represented by the structural formula

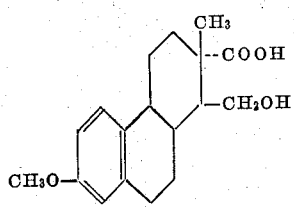

The substitution of an equivalent quantity of trans-2-carboxy-1-formyl-2-methyl-1,2,3,4,4a,9,10,10a-octahydrophenanthren-7-ol 7-ethyl ether in the procedure of this example affords trans-2-carboxy-1-hydroxymethyl-2-methyl-1,2,3,4,4a,9,10,10a-octahydrophenanthren-7-ol 7-ethyl ether.

Example 6

A mixture of one part of trans-2-carboxy-1-hydroxymethyl-1,2,3,4,4a,9,10,10a-octahydrophenanthren-7-ol 7-methyl ether, 0.01 part of p-toluenesulfonic acid monohydrate and 264 parts of benzene is distilled until approximately 88 parts of benzene is collected. The reaction mixture is then cooled to room temperature and is washed with dilute aqueous sodium bicarbonate, then is dried over anhydrous magnesium sulfate and concentrated to dryness at reduced pressure to afford crystals of 3-methoxy-16-oxaestra-1,3,5(10)-trien-17-one, melting at about 168–170°. Crystallization of that material from acetone has no effect upon the melting point. This substance is characterized also by infrared absorption maxima at about 3.4, 5.62, 6.2, 9.26, and 10.12 microns and is represented by the structural formula

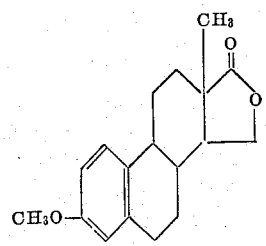

The substitution of an equivalent quantity of trans-2-carboxy-1-hydroxymethyl-2-methyl-1,2,3,4,4a,9,10,-10a-octahydrophenanthren-7-ol 7-ether in the procedure of this example results in 3-ethoxy-16-oxaestra-1,3,5(10)-trien-17-one.

Example 7

A mixture of 1.5 parts of 3-methoxy-16-oxaestra-1,3,5 (10)-trien-17-one, 7 parts of potassium hydroxide, and 40 parts by volume of 95% ethanol is heated at about 200° for about 23 hours in a closed vessel, then is cooled to room temperature and made acidic by the addition of dilute hydrochloric acid. This acidic mixture is then diluted with water to about 800 parts by volume, and the organic solvent is removed by distillation. Cooling of the resulting aqueous mixture to about 5° results in crystallization of the product, which is collected by filtration, washed on the filter with water, and dried under reduced pressure. The resulting crude product is 3-hydroxy-17-oxaestra-1,3,5(10)-trien-17-one, melting at about 260–270°. Purification by crystallization from acetone affords a pure sample, melting at about 286–287° and characterized further by an optical rotation of +59.5° in pyridine and also by infrared absorption maxima at about 2.95, 3.40, 5.72, 6.21, 6.23, 8.18, 9.15, 10.24, and 11.42 micron (potassium bromide). It is represented by the structural formula

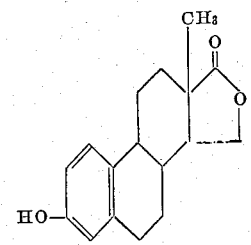

Example 8

By substituting 1.57 parts of 3-methoxy-17-oxa-D-homoestra-1,3,5(10)-trien-17a-one and otherwise proceeding according to the processes described in Example 7, 3-hydroxy-17-oxa-D-homoestra-1,3,5(10)-trien-17a-one, melting at about 275–278°, is obtained. Recrystallization of this crude product from acetone affords a pure sample, melting at about 281–282° and displaying an optical rotation of +85° in pyridine. Infrared absorption maxima are observed at about 3.01, 3.39, 5.88, 6.21, 7.92, 8.60, 9.40, and 11.45 microns (potassium bromide). It is further characterized by the structural formula

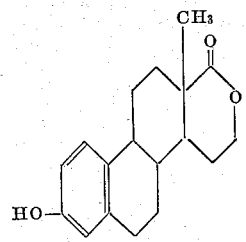

Example 9

To a solution of 1.5 parts of 3-hydroxy-16-oxaestra-1,3,5(10)-trien-17-one in 10 parts of pyridine and 250 parts by volume of 4% aqueous sodium hydroxide is added dilute hydrochloric acid, at 5–10°, until the mixture is acidic. The precipitate which forms is rapidly collected by filtration, washed on the filter with water and dried to yield trans-2-carboxy-1-hydroxymethyl-2-methyl-1,2,3,4,4a,9,10,10a-octahydrophenanthren-7-ol, melting at about 282–284° with evolution of a gas. Infrared absorption maxima are observed at about 2.99, 3.07, 3.39, 5.87, 6.31, 7.80, 7.98, 9.81, 10.98, and 12.67 microns (potassium bromide). It is represented by the structural formula

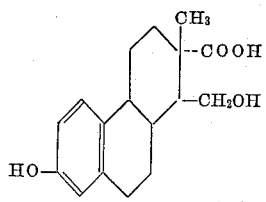

*Example 10*

To a solution of 2 parts of 3-methoxy-16-oxaestra-1,3,5(10)-trien-17-one in 87 parts of dry toluene is added, at −70°, 5.25 parts by volume of a 25% solution of diisobutyl aluminum hydride in toluene. This reaction mixture is stirred at that temperature for about one hour, then is poured carefully, with stirring, into a mixture of 100 parts of water and 200 parts of ice containing 42 parts of acetic acid. The organic layer is then separated, washed successively with water and saturated aqueous sodium bicarbonate, dried over anhydrous magnesium sulfate and concentrated to dryness at reduced pressure. The resulting crystalline residue is dissolved in benzene, and that solution is chromatographed on a silica gel column. Elution of the column with 10% ethyl acetate in benzene affords 3-methoxy-16-oxaestra-1,3,5(10)-trien-17-ol, melting at about 137–139°. It is characterized further by infrared absorption maxima at about 2.96, 3.04, 3.4, 6.22, 7.59, 9.13, and 11.29 microns (potassium bromide). This compound can be represented by the structural formula

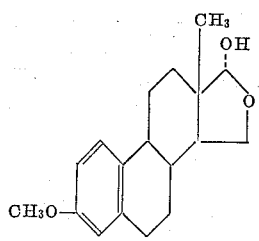

*Example 11*

The reduction of 2.1 parts of 3-methoxy-17-oxa-D-homoestra-1,3,5(10)-trien-17a-one by the procedure described in Example 10 results in 3-methoxy-17-oxa-D-homoestra-1,3,5(10)-trien-17a-ol, melting at about 132–133°. Purification by recrystallization from ether-hexane results in the pure material, melting at about 144–146°. Infrared absorption maximum are observed at about 6.21, 7.58, 8.08, 8.60, 9.2, and 9.57 microns (potassium bromide). This substance is represented by the structural formula

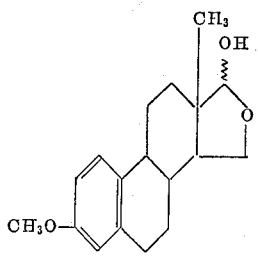

*Example 12*

To a solution of 2 parts of 3-methoxy-16-oxaestra-1,3,5(10)-trien-17-one in 20 parts of anisole is added, with stirring, 5 parts by volume of a 3 molar methyl magnesium bromide solution in dibutyl ether. Stirring at room temperature is continued for about 40 minutes, after which time the reaction mixture is diluted successively with 8 parts of methanol and 1000 parts of water. The resulting aqueous mixture is extracted with chloroform, and the organic layer is separated, dried over anhydrous magnesium sulfate and concentrated to dryness. Trituration of the residue with a mixture of ether and hexane affords trans-1-hydroxymethyl-2 - (1-hydroxy-1-methyl) ethyl-2 - methyl - 1,2,3,4,4a,9,10,10a - octahydrophenanthren-7 ol 7-methyl ether, melting at about 165–169°. Recrystallization of this crude product from ether affords a pure sample, melting at about 166–168° and characterized further by an optical rotation of −9° in chloroform and also by infrared absorption maxima at about 2.99, 3.42, 6.23, 7.82, 8.32, and 9.65 microns.

*Example 13*

A mixture of 2.5 parts of trans-1-hydroxymethyl-2-(1-hydroxy-1-methyl)ethyl-2 - methyl-1,2,3,4,4a,9,10,10a-octahydrophenanthren-7-ol 7-methyl ether, 5 parts of acetic anhydride and 10 parts of pyridine is stored at room temperature for about 20 hours, then is diluted with about 200 parts of water. The resulting aqueous mixture is extracted with chloroform, and the chloroform layer is separated, washed successively with dilute hydrochloric acid, water, and saturated aqueous sodium bircarbonate, then is dried over anhydrous magnesium sulfate and stripped of solvent by distillation at reduced pressure. The residual oily hydroxy-acetate exhibits infrared maxima at about 5.78, 6.21, 7.31, and 8.29 microns.

To a solution of the crude hydroxy-acetate in 15 parts of pyridine is added, at −15°, a solution of 2 parts of thionyl chloride in 10 parts of pyridine. After the reaction has proceeded at that temperature for about 25 minutes, the mixture is diluted with chloroform, then is washed carefully with saturated aqueous sodium bicarbonate. The organic solution is then dried over anhydrous magnesium sulfate and concentrated to dryness at reduced pressure to afford a residue of the acetoxy-olefin, characterized by infrared absorption maxima at about 5.8, 6.12, and 6.22 microns.

Into a solution of 2.2 parts of the latter acetoxy-olefin in 94 parts of methylene chloride is passed a stream of oxygen containing 6% of ozone, at −60°, until one molecular equivalent of ozone is absorbed. To that mixture is then added 2 parts of zinc and 8 parts of acetic acid, and heating at the reflux temperature is continued for about 15 minutes. The mixture is cooled, then diluted with chloroform and filtered, and the filtrate is washed with water, then dried over anhydrous magnesium sulfate and concentrated to dryness at reduced pressure to afford the acetoxy-ketone, characterized by infrared absorption peaks at about 5.78, 5.90, 6.21, and 8.61 microns.

To a solution of 2.2 parts of the latter acetoxy-ketone in 50 parts of volume of a 1:4 water-methanol solution is added 3 parts of sodium hydroxide, and the resulting solution is heated at the reflux temperature in a nitrogen atmosphere for about 5 minutes, then is stripped of methanol at reduced pressure, diluted with water and extracted with chloroform. The chloroform layer is separated, dried over anhydrous magnesium sulfate, and concentrated to dryness at reduced pressure. The residual amorphous solid is dissolved in benzene, and the benzene solution is chromatographed on a silica gel column. Elution of the column with 10% ethyl acetate in benzene affords trans - 1 - hydroxymethyl - 2 - methyl - 2 - methyl - carbonyl-1,2,3,4,4a,9,10,10a-octahydrophenanthren - 7 - ol 7-methyl ether, melting at about 127–129° and displaying an optical rotation of +45° in chloroform. Infrared absorption maxima are observed at about 2.9, 3.4, 5.92, 6.19, 7.96, 9.24, and 11.5 microns, and nuclear magnetic resonance peaks are found at about 53, 73, 85, 134, and 237 cycles per second. This compound can be represented by the structural formula

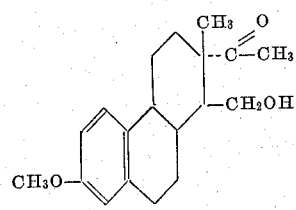

Example 14

To a solution of 6.2 parts of 3-methoxy-16-oxaestra-1,3,5(10)-trien-17-one in 222 parts of tetrahydrofuran is added 20 parts by volume of a 2.78 molar solution of vinyl magnesium chloride in tetrahydrofuran. The reaction mixture is kept at room temperature for about 3 hours, then is poured into a mixture of ice and water. This aqueous mixture is made acidic by the addition of 10% aqueous ammonium chloride, and the precipitate which forms is collected by filtration, washed on the filter with aqueous ammonium chloride and with water, then dried at reduced pressure. This crude product is dissolved in benzene, and the organic solution is chromatographed on a silica gel column. Elution of the column with 15% ethyl acetate in benzene affords trans-1-hydroxymethyl - 2 - methyl - 2 - vinylcarbonyl - 1,2,3,4,4a,9,10,10a-octahydrophenanthren-7-ol 7-methyl ether, characterized by infrared absorption peaks at about 5.92, 6.19, and 6.33 microns. This compound is represented by the structural formula

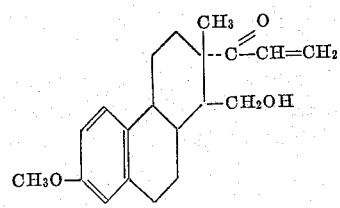

Example 15

To a solution of 20 parts of the 30% lithium acetylide-70% ethylene diamine complex in 133 parts of tetrahydrofuran, at about 5° in a nitrogen atmosphere, is added a solution of 3 parts of 3-methoxy-16-oxaestra-1,3,5(10)-trien-17-one in 50 parts of tetrahydrofuran. This reaction mixture is stirred for about 15 minutes at that temperature, then is poured carefully, with vigorous stirring, into a mixture of 100 parts of water and 600 parts of ice. This aqueous mixture is acidified by means of acetic acid, then is extracted with chloroform. The chloroform layer is separated, washed successively with water and saturated aqueous sodium bicarbonate, then dried over anhydrous magnesium sulfate and stripped of solvent at reduced pressure. The residual crude product is dissolved in benzene, and the benzene solution is chromatographed on a silica gel column. Elution of the column with 3% ethyl acetate in benzene affords crystals of trans-2-ethynylcarbonyl - 1 - hydroxymethyl - 2-methyl - 1,2,3,4,4a,9,10,10a-octahydrophenanthren-7-ol 7-methyl ether, melting at about 208–212°. This compound exhibits infrared absorption maxima at about 2.90, 3.03, 3.4, 5.92, 6.21, 7.56, 8.67, 9.09, 9.18, and 11.88 microns (potassium bromide) and is characterized further by the structural formula

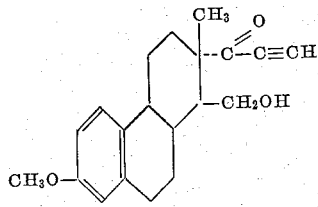

Example 16

To a solution of 3 parts of 3-methoxy-16-oxaestra-1,3,5(10)-trien-17-one in 45 parts of tetrahydrofuran is added, with stirring, 50 parts by volume of a 3 molar vinyl magnesium chloride solution in tetrahydrofuran. Stirring at room temperature is continued for about 2½ hours, after which time the reaction mixture is poured slowly, with vigorous stirring, into a mixture of 100 parts of water and 600 parts of ice. This mixture is acidified by the addition, of acetic acid, resulting in precipitation of the crude product, which is collected by filtration and dried. This solid material is dissolved in benzene, and the resulting organic solution is chromatographed on a silica gel column. Elution of the column with 5% ethyl acetate in benzene affords trans-2-(3-n-butenyl)carbonyl-1 - hydroxymethyl - 2 - methyl - 1,2,3,4,4a,9,10,10a-octahydrophenanthren-7-ol 7-methyl ether, melting at about 117°. It displays an optical rotation of +113° in chloroform and infrared absorption maxima at about 2.96, 3.4, 6.08, 6.23, 8.62, 9.18, and 10.31 microns (potassium bromide). This compound is represented by the structural formula

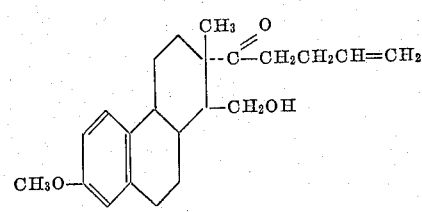

Example 17

To a solution of 2 parts of trans-1-hydroxymethyl-2-methyl-2-methylcarbonyl-1,2,3,4,4a,9,10,10a - octahydrophenanthrene-7-ol 7-methyl ether in 40 parts of methanol is added 0.05 part of p-toluenesulfonic acid monohydrate, and the precipitate which forms is collected by filtration and dried. This crude product is recrystallized from methylene chloride-methanol to afford 17β-methyl-16-oxaestra-1,3,5(10)-triene-3,17α-diol 3,17-dimethyl ether, which melts at about 169–171°. It is characterized further by an optical rotation of −28° in chloroform and also by infrared absorption peaks at about 3.38, 6.19, 8.04, 8.92, 9.17, 9.48, and 10.25 microns (potassium bromide). It can be represented by the structural formula

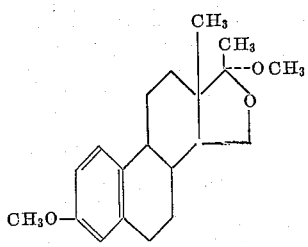

Example 18

The substitution of 1.9 parts of 3-methoxy-16-oxaestra-1,3,5(10)-trien-17-ol in the procedure of Example 17 results in 16-oxaestra-1,3,5(10)-triene-3,17α-diol 3,17-dimethyl ether, melting at about 109–110°. It exhibits infrared absorption maxima at about 3.41, 6.22, 8.08, 9.12, 9.67, 10.02, 10.25, and 10.66 microns (potassium bromide), an optical rotation of −38° in chloroform, and is characterized further by the structural formula

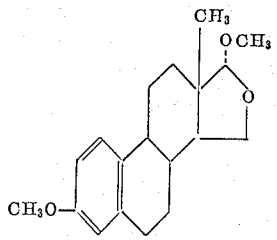

*Example 19*

To a solution of 5 parts of trans-2-(3-butenyl)-carbonyl-1 - hydroxymethyl - 2 - methyl - 1,2,3,4,4a,9,10,10a-octahydrophenanthren-7-ol 7-methyl ether in 400 parts of warm methanol is added 0.3 part of p-toluenesulfonic acid monohydrate, and the reaction mixture is cooled to room temperature. The precipitate which has formed is collected by filtration and recrystallized from methylene chloride-methanol, resulting in 17-(3-butenyl)-16-oxaestra-1,3,5(10)-triene-3,17α-diol 3,17-dimethyl ether, melting at about 105–107°. This substance is characterized also by infrared absorption maxima at about 3.38, 6.08, 6.21, 7.6, 8.08, 8.6, 9.4, and 10.1 microns (potassium bromide), and by an optical rotation of −15° in chloroform and by the structural formula

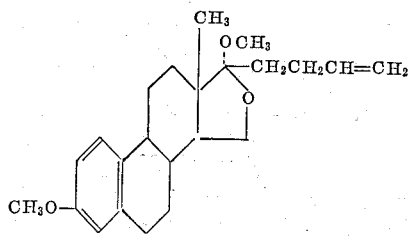

*Example 20*

To a solution of 3 parts of trans-2-(3-butenyl)-carbonyl-1-hydroxymethyl - 2 - methyl - 1,2,3,4,4a,9,10,10a-octahydrophenanthren-7-ol 7-methyl ether in 360 parts of ethyl acetate is added one part of 5% palladium-on-carbon catalyst, and the reaction mixture is stirred in a hydrogen atmosphere at one atmosphere pressure until one molecular equivalent of hydrogen is absorbed. Removal of the catalyst by filtration affords a filtrate which is concentrated to dryness at reduced pressure. Crystallization of the resulting residue from acetone-hexane affords 17β-n-butyl-3-methoxy-16-oxaestra-1,3,5,(10)-trien-17α-ol, which displays a melting point at about 107–108° and also infrared absorption maxima at about 2.97, 3.39, 6.22, 6.33, and 10.2 microns (potassium bromide). It is characterized further by an optical rotation of +40° in chloroform and by the structural formula

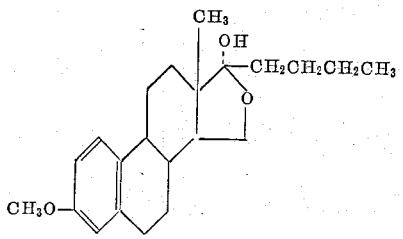

*Example 21*

By substituting 2.28 parts of 17-n-butyl-3-methoxy-16-oxaestra-1,3,(10)-trien-17-ol and otherwise proceeding according to the processes described in Example 17, 17β-n-butyl-16-oxaestra-1,3,5(10)-triene-3,17α - diol  3,17 - dimethyl ether is obtained. This compound displays a melting point at about 130–131° and is characterized also by an optical rotation of −14.5° in chloroform and by the structural formula

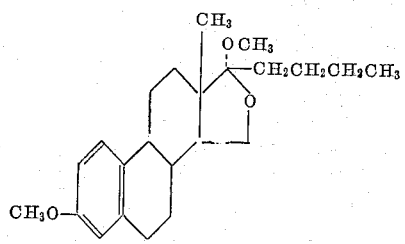

*Example 22*

A solution of 1.15 parts of 3-hydroxy-16-oxaestra-1,3,5(10)-trien-17-one and 4.3 parts of acetic anhydride in 7.9 parts of pyridine is heated on the steam bath for about 1¾ hours, then is allowed to stand at room temperature for about 16 hours. The reaction mixture is then diluted with water, and the resulting precipitate is collected by filtration and dried to afford 3-acetoxy-16-oxaestra-1,3,5(10)-trien-17-one, melting at about 172–174°. Recrystallization from methanol affords a pure sample, melting at about 173–175°, and displaying an optical rotation of +60.5° in chloroform. Infrared absorption maxima, in chloroform, are observed at about 3.49, 5.60, 5.64, and 6.21 microns. This compound is characterized further by the following structural formula

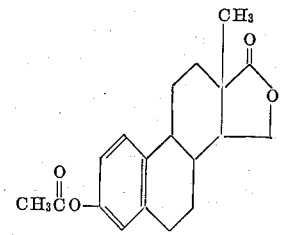

*Example 23*

By substituting an equivalent quantity of 3-methoxy-17-oxa-D-homoestra-1,3,5(10)-trien-17a-ol in the procedure of Example 17, followed by "work up" of the reaction mixture, results in a crude residue which is dissolved in benzene and absorbed on a basic alumina chromatographic column. Elution of the column with hexane affords 17 - oxa-D-homoestra-1,3,5(10)-triene-3(17a)α-diol 3,17a-dimethyl ether, melting at about 92–93° and exhibiting an optical rotation of −10.5° in chloroform. Further elution of the chromatographic column with hexane affords 17 - oxa - D - homoestra-1,3,5(10)-triene-3(17a)β-diol 3,17a-dimethyl ether, melting at about 175–177° and exhibiting an optical rotation of +108.5° in chloroform. This compound is represented by the following structural formula

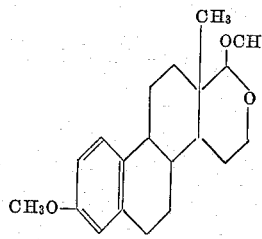

*Example 24*

A mixture of one part of 16-oxaestra-1,3,5(10)-triene-3,17α-diol 3-methyl ether, 9 parts of pyridine, and 3.3 parts of acetic anhydride is heated on the steam bath for about 2 hours, then is allowed to stand at room temperature for about 16 hours. Dilution with water, at 0–5°, results in separation of a semi-crystalline precipitate. The reaction mixture is then extracted with benzene, and the benzene layer is separated, washed successively with water, 1% aqueous acetic acid, water, and dilute aqueous sodium bicarbonate, then is dried over anhydrous sodium sulfate and stripped of solvent under reduced pressure. Trituration of the residue with ether-hexane affords crystals of trans-1-acetoxymethyl-2-formyl-2-methyl - 1,2,3,4,4a,9, 10,10a-octahydrophenanthren-7-ol 7-methyl ether, melting at about 114–116°. It exhibits infrared absorption maxima at about 3.64, 5.73, 5.80, 6.18, 6.33, and 8.08 microns, in a potassium bromide disc, and displays also an optical rotation of +77.5° in chloroform.

Example 25

The substitution of an equivalent quantity of 3-methoxy-17-oxa-D-homoestra-1,3,5(10)-trien-17a-ol in the procedure of Example 24 results in 3-methoxy-17-oxa-D-homoestra-1,3,5(10)-trien-17a-ol 17a-acetate, melting at about 128–131°. It exhibits nuclear magnetic resonance peaks at about 62, 65, 127, 128.5, 227, 318, and 339 cycles per second and is further characterized by the following structural formula

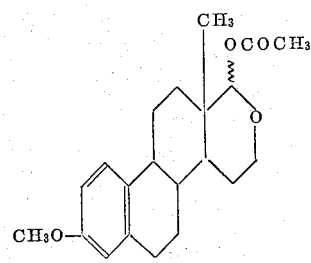

Example 26

A mixture of 25 parts of dl-13β-ethyl-3-methoxygona-1,3,5(10)-trien-17-one, 8 parts of p-toluenesulfonic acid monohydrate, and 2800 parts by volume of isopropenyl acetate is distilled slowly over a period of about 13 hours, during which time approximately 1500 parts by volume of distillate is collected. The mixture is then concentrated to dryness under reduced pressure, and the resulting residue, which crystallizes upon cooling, is stirred with 700 parts of ether containing 40 parts of pyridine. Filtration affords crude dl - 17 - acetoxy - 13β-ethylgona-1,3, 5(10),16-tetraen-3-ol 3-methyl ether, melting at 122–130°. The filtrate is washed with water, dried over anhydrous magnesium sulfate and concentrated to dryness under reduced pressure. Trituration of the resulting residue with methanol yields additional crude enol acetate, melting at about 128–132°. Recrystallization of the total crude product from methylene chloride-methanol containing decolorizing carbon results in the pure product, melting at about 135–136°.

By substituting an equivalent quantity of dl-17-acetoxy-13β - ethylgona - 1,3,5(10),16-tetraen-3-ol 3-methyl ether and otherwise proceeding according to the processes described in Example 1, dl-trans-2-carboxy-1-formylmethyl-2 - ethyl-1,2,3,4,4a,9,10,10a-octahydrophenanthren-7-ol 7-methyl ether is obtained. This substance displays infrared maxima, in chloroform, at about 2.90–4.10, 3.40, 3.67, 5.80, 5.90, and 6.20 microns and is characterized further by the following structural formula

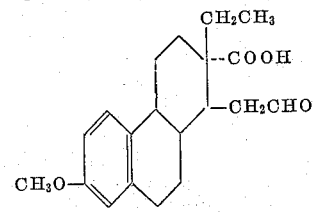

Example 27

The substitution of an equivalent quantity of dl-trans-2 - carboxy - 1 - formylmethyl-2-ethyl-1,2,3,4,4a,9,10,10a-octahydrophenanthren - 7 - ol 7-methyl ether in the procedure of Example 2 results in dl-3-methoxy-13β-ethyl-17-oxa-D-homogona-1,3,5(10),15-tetraen-17a - one. A pure sample, melting at about 122–124° is obtained by recrystallization from methylene chloride-methanol. Infrared absorption maxima, in a potassium bromide disc, are observed at about 5.65, 6.03, 6.19, 8.12, 9.23, 9.83, and 10.56 microns.

Example 28

The ozonolysis of an equivalent quantity of dl-3-methoxy-13β-ethyl-17-oxa-D-homogona - 1,3,5(10),15-tetraen-17a-one by the procedure described in Example 4 results in dl-trans - 2 - carboxy - 1-formyl-2-ethyl-1,2,3,4,4a,9,10, 10a-octahydrophenanthren-7-ol 7-methyl ether, characterized by infrared absorption peaks, in chloroform, at about 3.66, 5.80, and 5.90 microns.

Example 29

By the reduction of an equivalent quantity of dl-trans-2 - carboxy - 1 - formyl - 2 - ethyl - 1,2,3,4,4a,9,10,10a-octahydrophenanthren-7-ol 7-methyl ether according to the processes described in Example 5, there is obtained dl - trans - 2 - carboxy - 1 - hydroxymethyl-2-ethyl-1,2,3, 4,4a,9,10,10a-octahydrophenanthren-7-ol 7-methyl ether. This compound exhibits infrared absorption maxima, in chloroform, at about 3.0–4.1 and 5.9 microns. It is represented by the following structural formula

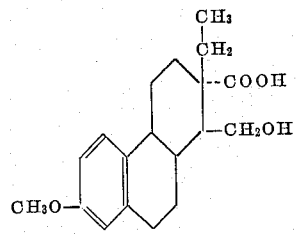

Example 30

The cyclization of an equivalent quantity of dl-trans-2-carboxy - 1 - hydroxymethyl - 2 - ethyl - 1,2,3,4,4a,9,10, 10a-octahydrophenanthren-7-ol 7-methyl ether by the procedure described in Example 6 results in dl-3-methoxy-13β-ethyl-16-oxagona-1,3,5(10)-trien-17-one. Recrystallization from methanol affords a pure sample melting at about 147–150° and exhibiting characteristic infrared absorption peaks, in chloroform, at about 5.65 and 6.21 microns. It is further characterized by the following structural formula

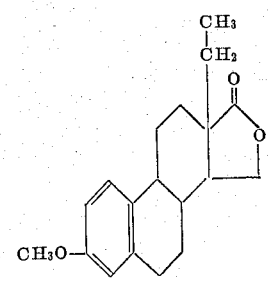

Example 31

The reduction of an equivalent quantity of dl-3-methoxy - 13β - ethyl-16-oxagona-1,3,5(10)-trien-17-one by the procedure described in Example 10 results in dl-3-methoxy-13β-ethyl-16-oxagona-1,3,5(10)-trien-17α-ol.

Example 32

The substitution of an equivalent quantity of propionic anhydride in the procedure of Example 22 results in 16-oxa-3-propionoxyestra-1,3,5(10)-trien-17-one.

Example 33

The reaction of 1.9 parts of 3-methoxy-16-oxaestra-1,3, 5(10)-trien-17-ol with 58 parts of ethanol and 0.05 part of p-toluenesulfonic acid monohydrate by the procedure described in Example 17 results in 3-methoxy-16-oxaestra-1,3,5(10)-trien-17-ol 17-ethyl ether.

Example 34

By substituting an equivalent quantity of propionic anhydride and otherwise proceeding according to the processes described in Example 24, there is obtained trans-2-formyl - 2 - methyl - 1 - propionoxymethyl - 1,2,3,4,4a,9, 10,10a-octahydrophenanthren-7-ol 7-methyl ether.

Example 35

The reaction of 3-methoxy-16-oxaestra-1,3,5(10)-trien-17-one with an equivalent quantity of propyne according to the procedure of Example 15 results in trans-1-hydroxymethyl - 2 - methyl - 1 - propynylcarbonyl-1,2,3,4,4a,9, 10,10a-octahydrophenanthren-7-ol 7-methyl ether.

Example 36

By substituting an equivalent quantity of 3-methoxy-17-oxa-D-homoestra-1,3,5(10)-trien-17a-one and otherwise proceeding according to the processes described in Example 12, there is obtained trans-1-hydroxyethyl-2-(1-hydroxy - 1 - methyl)ethyl-2-methyl-1,2,3,4,4a,9,10,10a-octahydrophenanthren-7-ol 7-methyl ether.

Example 37

The substitution of an equivalent quantity of trans-1-hydroxyethyl - 2-(1-hydroxy-1-methyl)ethyl-2-methyl-1,2, 3,4,4a,9,10,10a-octahydrophenanthren-7-ol 7-methyl ether in the procedure of Example 13 results in 17a-methyl-17-oxa - D - homoestra-1,3,5(10)-triene-3,17a-diol 3-methyl ether, melting at about 108–110°, and characterized further by the following structural formula

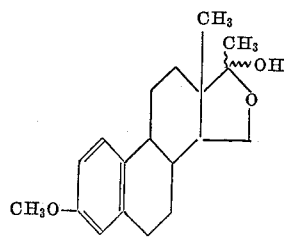

Example 38

By substituting an equivalent quantity of trans-1-hydroxyethyl - 2 - methyl-2-methylcarbonyl - 1,2,3,4,4a,9,10, 10a-octahydrophenanthren-7-ol 7-methyl ether and otherwise proceeding according to the processes described in Example 17, there is obtained 17aβ-methyl-17-oxa-D-homoestra - 1,3,5(10) - triene-3,17aα-diol, 3,17a-dimethyl ether, melting at about 118–120° and displaying an optical rotation of −14.5° in chloroform. It is further characterized by the following structural formula

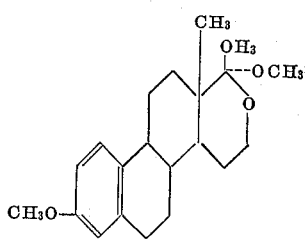

What is claimed is:
1. A member selected from the group of compounds represented by the formulas

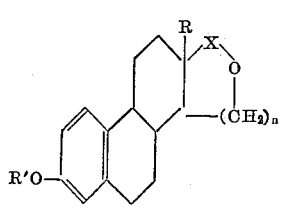

and

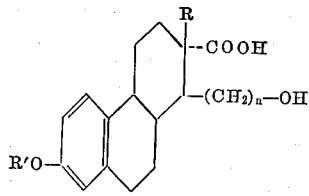

wherein R′ is a member of the class consisting of hydrogen, lower alkyl, and lower alkanoyl radicals, R is a lower alkyl radical, n is a positive integer less than 3, and X is selected from the group consisting of carbonyl and radicals of the formula

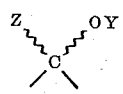

wherein Y is selected from the group consisting of hydrogen, lower alkyl, and lower alkanoyl radicals and Z is a member of the class consisting of hydrogen and a lower aliphatic hydrocarbon radical.

2. A compound of the formula

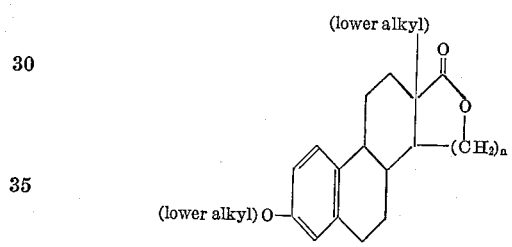

wherein $n$ is a positive integer less than 3.

3. A compound of the formula

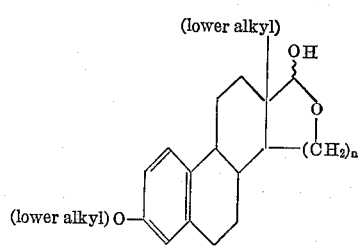

wherein $n$ is a positive integer less than 3.

4. A compound of the formula

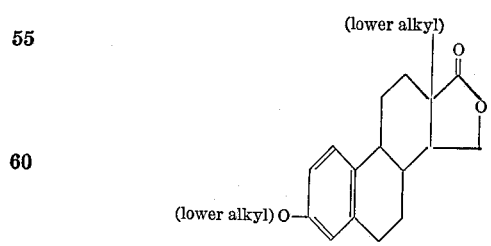

5. A compound of the formula

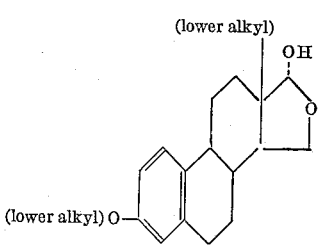

6. A compound of the formula

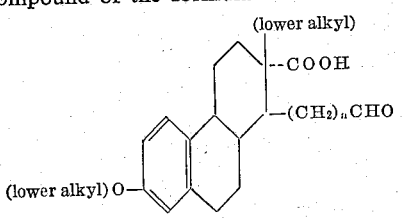

wherein *n* is an integer from 0 to 1, inclusive.

7. 3-methoxy-16-oxaestra-1,3,5(10)-trien-17-one.
8. 3-acetoxy-16-oxaestra-1,3,5(10)-trien-17-one.
9. 3-hydroxy-17-oxa-D-homoestra-1,3,5(10)-trien - 17a-one.
10. 3-methoxy-16-oxaestra-1,3,5(10)-trien-17α-ol.
11. 13β - ethyl-3-methoxy-16-oxagona-1,3,5(10)-trien-17-one.
12. 17β - methyl - 16 - oxaestra-1,3,5(10)-triene-3,17α-diol, 3,17-dimethyl ether.
13. Trans - 2 - (3-n-butenyl)carbonyl-1-hydroxymethyl-2 - methyl - 1,2,3,4,4a,9,10,10a - octahydrophenanthren-7-ol 7-methyl ether.
14. 3 - methoxy - 17-oxa-D-homoestra-1,3,5(10)-trien-17a-ol.
15. Trans - 1 - acetoxymethyl - 2-formyl-2-methyl-1,2,3,4,4a,9,10,10a-octahydrophenanthren-7-ol 7-methyl ether.
16. 16 - oxaestra - 1,3,5(10)-triene-3,17α-diol 3,17-dimethyl ether.
17. Trans - 2 - carboxy-1-formyl-2-methyl-1,2,3,4,4a,9,10,10a-octahydrophenanthren-7-ol 7-methyl ether.
18. Trans - 2 - carboxy-1-hydroxymethyl-2-methyl-1,2,3,4,4a,9,10,10a-octahydrophenanthren-7-ol 7-methyl ether.
19. Trans - 2 - carboxy-1-hydroxymethyl-2-methyl-1,2,3,4,4a,9,10,10a-octahydrophenanthren-7-ol.
20. 3 - methoxy - 17 - oxa-D-homoestra-1,3,5(10),15-tetraen-17a-one.
21. *dl*-3-methoxy-13β-ethyl-17-oxa-D-homogona - 1,3,5(10),15-tetraen-17a-one.

References Cited by the Examiner

UNITED STATES PATENTS 2,499,257   2/1950   Picha et al. _____ 260—343.2

OTHER REFERENCES

Breitner: Chemical Abstracts, vol. 38 (1944), page 4953.
Jacobsen: J. Biol. Chem., vol. 171 (1947), pages 61–70.
Seeman et al.: Jour. Amer. Chem. Soc., vol. 72 (1950), pages 4073–77.

WALTER A. MODANCE, *Primary Examiner.*

J. A. PATTEN, *Assistant Examiner.*